US010343485B1

(12) United States Patent
Yaldo et al.

(10) Patent No.: US 10,343,485 B1
(45) Date of Patent: Jul. 9, 2019

(54) VEHICLE PASSENGER SEAT FOR DETECTING AND REMOVING MOISTURE, VEHICLE HAVING THE VEHICLE PASSENGER SEAT, AND RIDE SHARE SYSTEM INCLUDING A VEHICLE HAVING THE VEHICLE PASSENGER SEAT

(71) Applicant: GM GLOBAL TECHNOLOGY OPERATIONS LLC, Detroit, MI (US)

(72) Inventors: Valor Yaldo, West Bloomfield, MI (US); Rawaa Yaldo, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/014,541

(22) Filed: Jun. 21, 2018

(51) Int. Cl.
| *B60H 1/00* | (2006.01) |
| *B60N 2/56* | (2006.01) |
| *H04W 4/40* | (2018.01) |
| *G06Q 10/02* | (2012.01) |
| *G06Q 50/30* | (2012.01) |

(52) U.S. Cl.
CPC ....... *B60H 1/00735* (2013.01); *B60N 2/5657* (2013.01); *H04W 4/40* (2018.02); *G06Q 10/02* (2013.01); *G06Q 50/30* (2013.01)

(58) Field of Classification Search
None
See application file for complete search history.

(56) References Cited

U.S. PATENT DOCUMENTS

| 7,084,763 | B2 | 8/2006 | Shieh et al. |
| 7,497,465 | B2 | 3/2009 | Wato et al. |
| 8,688,378 | B2 | 4/2014 | McCall et al. |
| 8,688,532 | B2 | 4/2014 | Khunger et al. |
| 9,807,547 | B1 | 10/2017 | Oesterling et al. |
| 2003/0039298 | A1* | 2/2003 | Eriksson ............ B60H 1/00785 374/109 |
| 2005/0023810 | A1 | 2/2005 | Basir et al. |
| 2005/0275202 | A1* | 12/2005 | Wato ................. B60R 21/01532 280/735 |
| 2009/0193814 | A1* | 8/2009 | Lofy .................... B60N 2/5657 62/3.61 |
| 2017/0284819 | A1* | 10/2017 | Donnelly ............... G06Q 50/30 |
| 2017/0327082 | A1 | 11/2017 | Kamhi et al. |
| 2017/0349027 | A1 | 12/2017 | Goldman-Shenhar et al. |
| 2017/0351990 | A1 | 12/2017 | Hecht et al. |

* cited by examiner

*Primary Examiner* — Thomas S McCormack

(57) ABSTRACT

A vehicle passenger seat includes a moisture sensor that detects a moisture level of the vehicle passenger seat and generates a moisture level signal based upon the detected moisture level, and a processor in communication with the moisture sensor and that determines whether the moisture level signal exceeds a predetermined moisture level threshold.

15 Claims, 5 Drawing Sheets

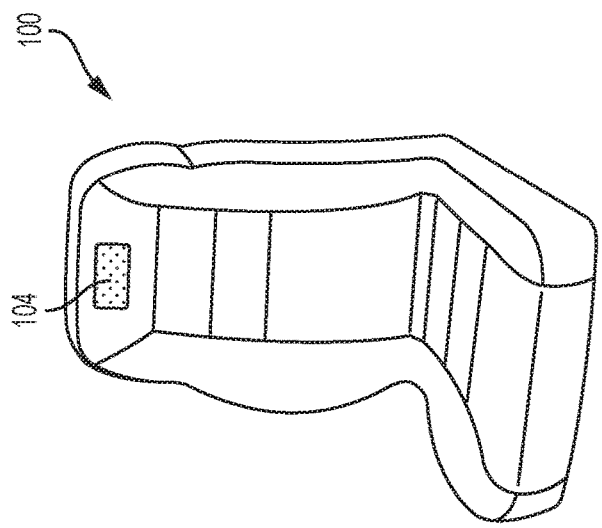
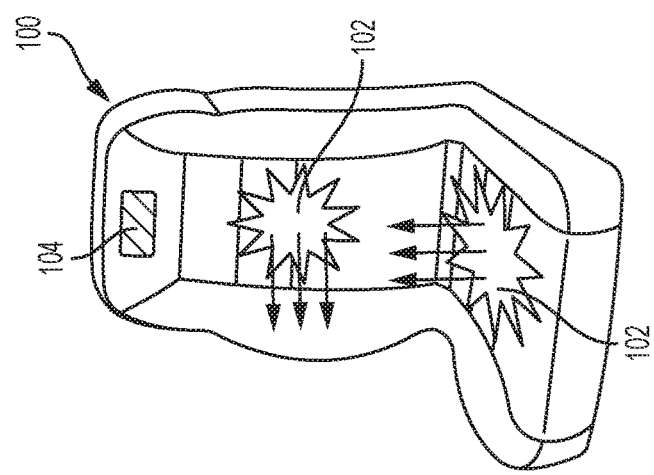
FIG. 1A
FIG. 1B

VEHICLE PASSENGER SEAT FOR DETECTING AND REMOVING MOISTURE, VEHICLE HAVING THE VEHICLE PASSENGER SEAT, AND RIDE SHARE SYSTEM INCLUDING A VEHICLE HAVING THE VEHICLE PASSENGER SEAT

FIELD

The present disclosure relates to a vehicle passenger seat for detecting and removing moisture, a vehicle having the vehicle passenger seat, and ride share system including a vehicle having the vehicle passenger seat.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Many people are looking for ways to minimize expenses incurred in their day-to-day travels. More energy-efficient vehicles are being designed and manufactured, and some individuals are relying more on public transportation. One of the primary disadvantages in public transportation, however, is its lack of convenience in that public transport vehicles typically make several stops along a predetermined and scheduled route, thereby extending the rider's travel time. Another disadvantage is that the rider is limited to the scheduled pick-up/drop-off times scheduled by the transportation company.

Self-service vehicle rental services are currently offered which provide increased flexibility for a rider. In some self-service vehicle rental services a rider is able to reserve a vehicle which meets the requirements of that rider, pick up the vehicle, drive the vehicle, and then return it. There are also on-demand transportation services where a rider may reserve a vehicle and driver, the driver then drives the vehicle to the rider, picks up the rider, and drives the rider to the desired destination.

Manufacturers are increasingly producing vehicles having higher levels of driving automation. Features such as adaptive cruise control and lateral positioning have become popular and are precursors to greater adoption of fully autonomous-driving-capable vehicles. Also, with highly automated vehicles expected to be commonplace, markets for fully-autonomous taxi services and shared vehicles are developing.

In contrast to some on-demand transportation services where a driver may be present in the vehicle and who may be responsible for maintaining the condition of the vehicle and ensuring its suitability for taking on passengers, an on-demand autonomous vehicle may require maintenance that might go unnoticed before that vehicle is offered to a new passenger. In vehicle rental systems, including those which may be self-service, a rental company may need to review the condition of a vehicle to determine whether maintenance is needed before offering that vehicle to a new customer. This can be a tedious task for company employees. While renting vehicles through self-service vehicle rental system provides a viable alternative to the typical vehicle rental systems and requires less employee work, maintenance and monitoring of the condition of the vehicles in these systems continues to require manual involvement.

With the continued introduction and development of autonomous vehicles, the autonomy involved with these vehicles makes it difficult for a company offering autonomous transportation services to review the vehicle condition, determine when maintenance is needed, and provide for that maintenance. For example, a user of an autonomous vehicle in a transportation service, may leave the vehicle in a condition that makes that vehicle unsatisfactory for the next user.

It is also anticipated that autonomous vehicles may soon be offered in a manner where multiple, otherwise unrelated riders may together occupy a vehicle. This is analogous to public transportation systems, but with the vastly improved flexibility of customizing each and every trip according to the riders who are currently occupying and sharing a trip in that vehicle. In these instances, trips may be scheduled and/or organized in a manner where multiple and unrelated riders may share the autonomous vehicle during a trip. In some instances, a seat in a shared vehicle may become wet and, thus, unsuitable for use. In the absence of a driver, or a person who is responsible for monitoring the condition of the vehicle, that vehicle may be provided to another rider who may be disappointed with a wet seat in the vehicle being offered to them. Such a situation may result in lost revenue to the vehicle owner/service provider.

SUMMARY

In an exemplary aspect, a vehicle passenger seat includes a moisture sensor that detects a moisture level of the vehicle passenger seat and generates a moisture level signal based upon the detected moisture level, and a processor in communication with the moisture sensor and that determines whether the moisture level signal exceeds a predetermined moisture level threshold.

In this manner, in response to a determination that the moisture level signal exceeds the predetermined moisture level threshold any of a variety of responses may be provided which enables remedying the wet condition of the vehicle passenger seat. This is particularly advantageous in a ride share system where it may be important to remove a vehicle passenger seat having a wet condition from availability to prospective riders until the wet condition may be corrected.

In another exemplary aspect, the vehicle passenger seat further includes an indicator that indicates when the moisture level signal exceeds the predetermined moisture level threshold.

In another exemplary aspect, the indicator includes a visual indicator.

In another exemplary aspect, the indicator includes an audible indicator.

In another exemplary aspect, the audible indicator includes a vocal indicator that generates a vocal request to dry the vehicle passenger seat.

In another exemplary aspect, the vehicle passenger seat further includes a blower and wherein the processor further activates the blower in response to a determination by the processor that the moisture level signal exceeds the predetermined moisture level threshold.

In another exemplary aspect, the vehicle passenger seat further includes a blower and the processor further activates the blower in response to a determination by the processor that the moisture level signal exceeds the predetermined moisture level threshold.

In another exemplary aspect, a vehicle includes a vehicle passenger seat positioned within the vehicle, a moisture sensor that detects a moisture level of the vehicle passenger seat and generates a moisture level signal based upon the detected moisture level, and a processor in communication with the moisture sensor and that determines whether the moisture level signal exceeds a predetermined moisture level threshold.

In another exemplary a system for implementing ride share services includes a vehicle with a vehicle passenger seat positioned within the vehicle, a moisture sensor that detects a moisture level of the vehicle passenger seat and generates a moisture level signal based upon the detected moisture level, and a processor in communication with the moisture sensor and that determines whether the moisture level signal exceeds a predetermined moisture level threshold. The system further includes a host computer in communication with the processor and in selective communication with a plurality of user devices each corresponding with a prospective rider, the host computer implementing ride share logic that allocates vehicle passenger seats among a plurality of vehicle passenger seats in each of a plurality of vehicles based upon the determination by the processor whether the moisture level signal exceeds the predetermined moisture level threshold.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1A is a perspective view of a vehicle passenger seat in a wet condition;

FIG. 1B is another perspective view of the vehicle passenger seat of FIG. 1A in a dry condition;

DETAILED DESCRIPTION

Figure 2C:
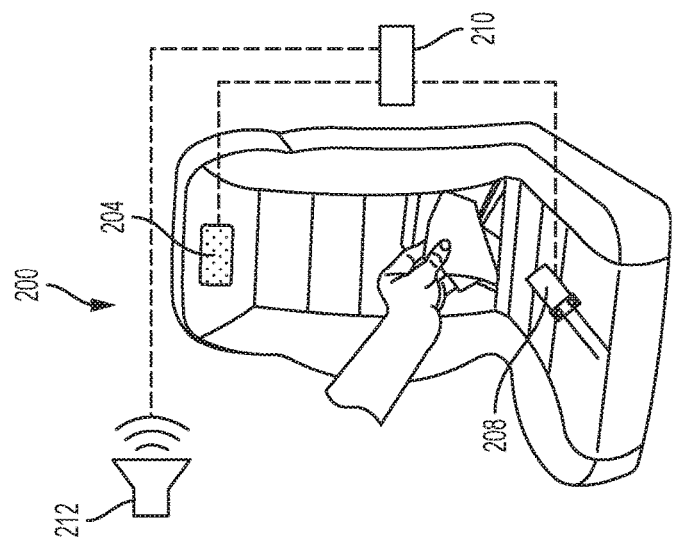
FIG. 2C is a perspective view of the vehicle passenger seat of FIG. 2A in a state of being maintained by a user (manual drying)

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a perspective view of a vehicle passenger seat 100 in a wet condition. The vehicle passenger seat 100 includes one or more wet and/or moist areas 102. As shared (or pooled) autonomous vehicle (not shown) which includes the vehicle passenger seat 100 having the wet areas 102 may be unsatisfactory to a potential passenger who would like to occupy the vehicle passenger seat 100. The origin of the wet area(s) 102 may be from any number of potential sources, such as, for example, a previous passenger having wet clothing occupying the seat, a previous passenger placing a wet and/or leaking object onto the seat or the like without limitation.

As a warning, the vehicle passenger seat 100 includes a visual indicator 104 which may illuminate in a manner which will draw the attention of a potential occupant of the seat and provide a visual warning that the vehicle passenger seat 100 includes wet area(s) 102. For example, the visual indicator 104 may illuminate in a red or amber color which typically represents a warning. In this manner, a potential occupant may then choose to occupy a different seat in the vehicle, choose to dry the seat themselves, alert others of the condition, and/or abandon the vehicle according to their preference. FIG. 1B illustrates the vehicle passenger seat 100 which does not include wet areas 102 and, in response, the visual indicator 104 may operate in a manner which either provides no warning (in the absence of a wet condition) or may provide a visual indicator that the seat is in a condition which is suitable to be occupied. For example, the visual indicator 104 may illuminate in a green color which typically represents a favorable condition for occupancy.

Figure 2B:
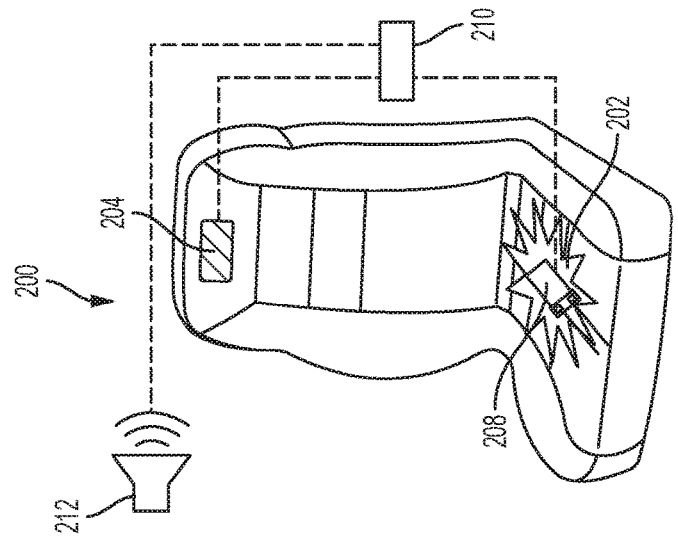
FIG. 2B is a perspective view of the vehicle passenger seat of FIG. 2A in a condition responsive to a wet condition.
Figure 2A:
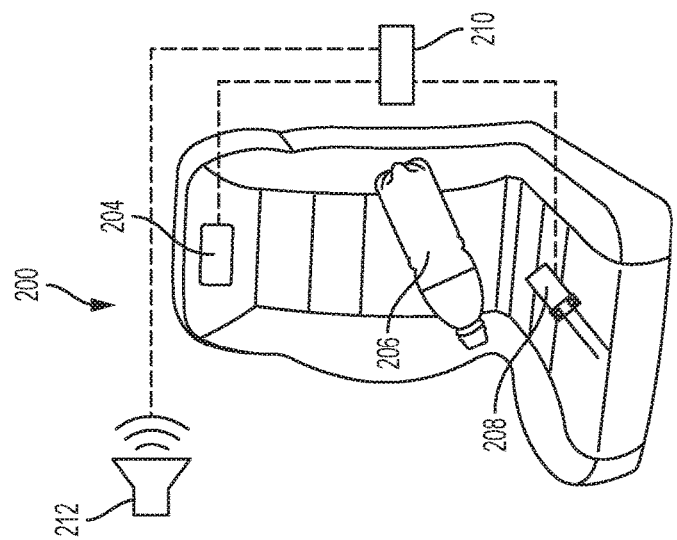
FIG. 2A is a perspective view of another vehicle passenger seat in accordance with the present disclosure.

FIGS. 2A through 2C illustrate perspective views of another vehicle passenger seat 200 in accordance with the present disclosure. The vehicle passenger seat 200 may include a visual indicator 204 which may operate in a manner similar to that described with reference to FIGS. 1A through 1B. FIG. 2A illustrates an object 206 that may be positioned on or near the vehicle passenger seat 200 and which may serves as a source for moisture that results in the creation of a wet area 202 on the vehicle passenger seat 200. For example, the object 206 may be a bottle of fluid that either sweats and drips moisture onto the vehicle passenger seat 200 and/or the bottle may leak fluid onto the vehicle passenger seat 200 to form a wet area 202.

The vehicle passenger seat 200 includes a moisture sensor 208 which senses the moisture level of the vehicle passenger seat 200 and generates a moisture level signal that is indicative of the moisture level of the vehicle passenger seat 200. The vehicle passenger seat 200 and/or the vehicle may include a processor 210 in communication with the moisture sensor 208 to receive the moisture level signal. The processor 210 may then determine whether the value of the moisture level signal exceeds a predetermined threshold. If, the processor 210 determines that the value of the moisture level signal exceeds the predetermined threshold, then the processor 210 may respond by sending a command to the visual indicator 204 to provide a warning.

The vehicle passenger seat 200 and/or a vehicle in which the vehicle passenger seat 200 is positioned, may further include an audible indicator 212. If the processor 210 determines that the value of the moisture level signal exceeds the predetermined threshold, then the processor 210 may respond by sending a command to the audible indicator 210 to provide an audible indication. For example, the audible indicator 210 may generate a noise which attracts attention to the vehicle passenger seat 200 so that occupants of the vehicle may notice the wet condition and take measures to remedy the condition and/or in another exemplary embodiment the audible indicator 210 may generate a voice recording warning of the wet condition and/or asking that the current occupants of the vehicle act to remedy the wet condition.

If, as illustrated in FIG. 2C, the wet condition is remedied, the moisture sensor 208 will then generate a moisture level signal having a value that is lower than the predetermined threshold, the processor 210 may determine that the moisture level signal has a value lower than the predetermined threshold and, in response, may then command the visual indicator 204 and the audible indicator 212 to assume a condition which is indicative of a non-wet condition of the vehicle passenger seat. For example, the audible indicator 212 may become silent and the visual indicator 204 may turn off or otherwise illuminate in a color that is indicative of a condition of the vehicle passenger seat 200 being ready for occupancy (e.g., illuminate in a green color).

Figure 3C:
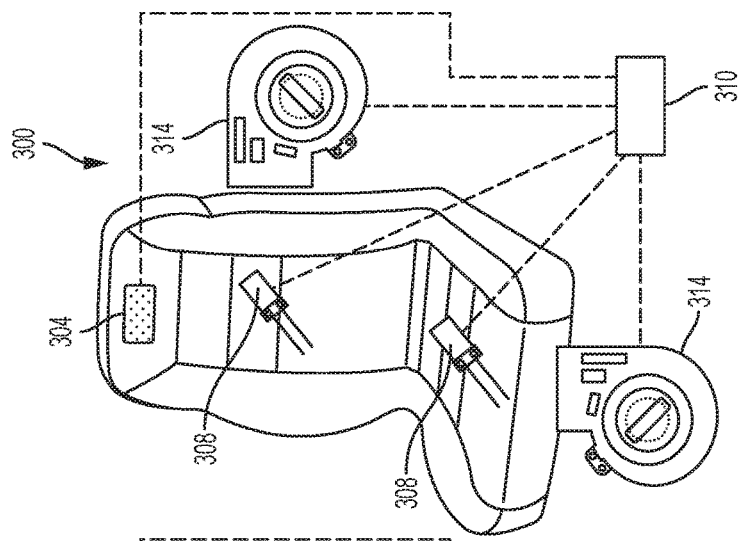
FIG. 3C is a perspective view of the vehicle passenger seat of FIG. 3A in a passenger available condition
Figure 3B:
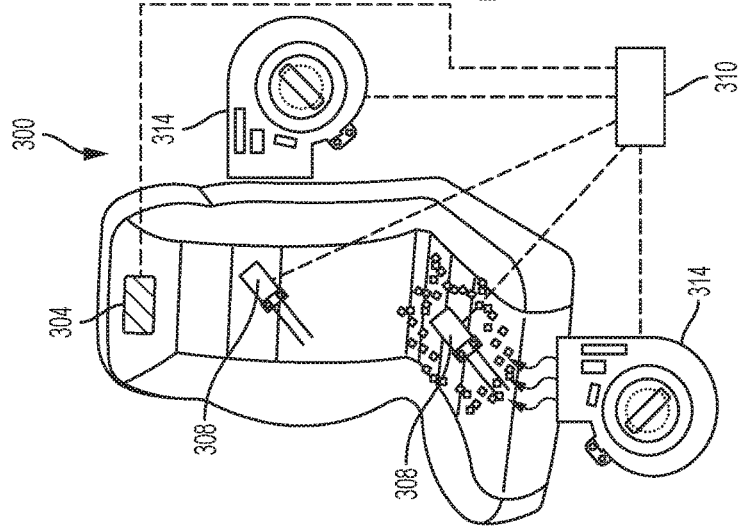
FIG. 3B is a perspective view of the vehicle passenger seat of FIG. 3A in a condition responsive to a wet condition.
Figure 3A:
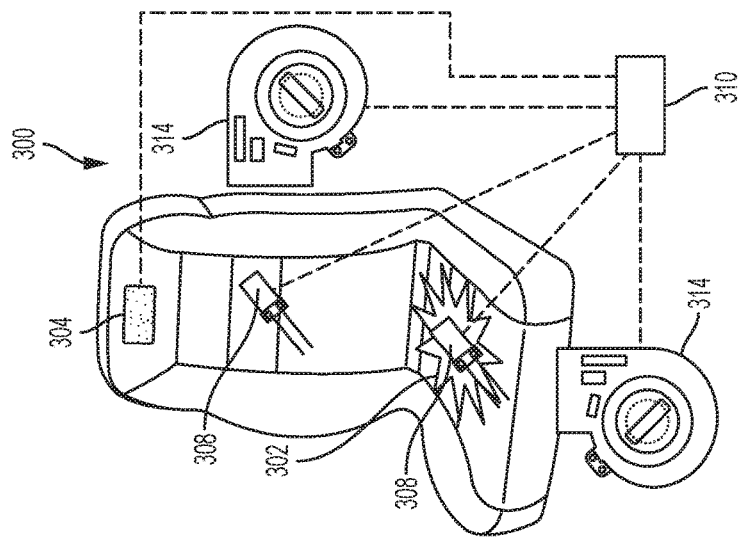
FIG. 3A is a perspective view of yet another vehicle passenger seat in accordance with the present disclosure.

FIGS. 3A through 3C illustrate yet another vehicle passenger seat 300 in accordance with the present disclosure. The vehicle passenger seat 300 includes a plurality of moisture sensors 308. While FIGS. 2A through 2C illustrate a vehicle passenger seat 200 having only a single moisture sensor 208 and FIGS. 3A through 3C illustrate a vehicle passenger seat 300 having two moisture sensors 308, it is understood that a vehicle and/or vehicle passenger seat which includes a moisture sensor that is capable of sensing a moisture level of a surface of a vehicle passenger seat is encompassed within the scope of the present disclosure.

The vehicle passenger seat 300 further includes a visual indicator 304 along with a processor 310 that is in communication with the visual indicator 304 and each of the plurality of moisture sensors 308. The processor 310 and visual indicator 304 may operate in a manner which is the same as or similar to that previously described with reference to FIGS. 1A through 2C. The vehicle passenger seat 300 of FIGS. 3A through 3C does not include an audible indicator. However, it is to be understood that this is merely one exemplary embodiment and that any number of audible indicators may optionally be included within the vehicle and/or vehicle passenger seat and remain within the scope of the present disclosure.

The vehicle passenger seat 300 includes a plurality of blowers 314. The plurality of blowers 314 may optionally be positioned within the vehicle passenger seat 300 and/or outside of the vehicle passenger seat 300 and incorporated into the vehicle (not shown) in which the vehicle passenger seat 300 is positioned. Each of the plurality of blowers is configured and positioned to generate a flow of air across one or more surfaces of the vehicle passenger seat 300 to encourage drying of any wet condition. For example, in response to the processor 310 determining that the value of a moisture level signal from a moisture sensor 308 exceeds a predetermined threshold as a result of a wet area 302 on the vehicle passenger seat (as illustrated in FIG. 3A), the processor 310 may generate a control signal that triggers operation of one or more of blowers 314 which correspond to the wet area 302. In this manner, the vehicle passenger seat 300 (and/or vehicle) may remedy the wet condition of the vehicle passenger seat 300 without requiring manual intervention by either an occupant of the vehicle and/or by an employee of a mobility service provider. In the absence of this automatic ability to remove the wet area 302, a customer or potential rider might experience disappointment and/or the vehicle may have to be entirely removed from availability for new riders until the vehicle may be manually serviced to remedy the wet condition. The vehicle and vehicle passenger seat 300 of the present disclosure obviates these problems, improves passenger satisfaction, maintains the availability of the vehicle in a mobility service, and continues the ability of that vehicle to generate revenue.

In accordance with an exemplary embodiment of the invention, ride share services are provided. The ride share services provide a means for subscribers of the services to share in carpooling activities (e.g., requesting a ride and offering a ride) through a flexible and convenient system. The ride share services further provide a means for a subscriber to pre-qualify candidates he/she wishes to participate in ride share events. The ride share services also minimize delays typically associated with coordinating schedules with ride sharing individuals through a dynamically updated user interface and user-configured settings.

Figure 4:
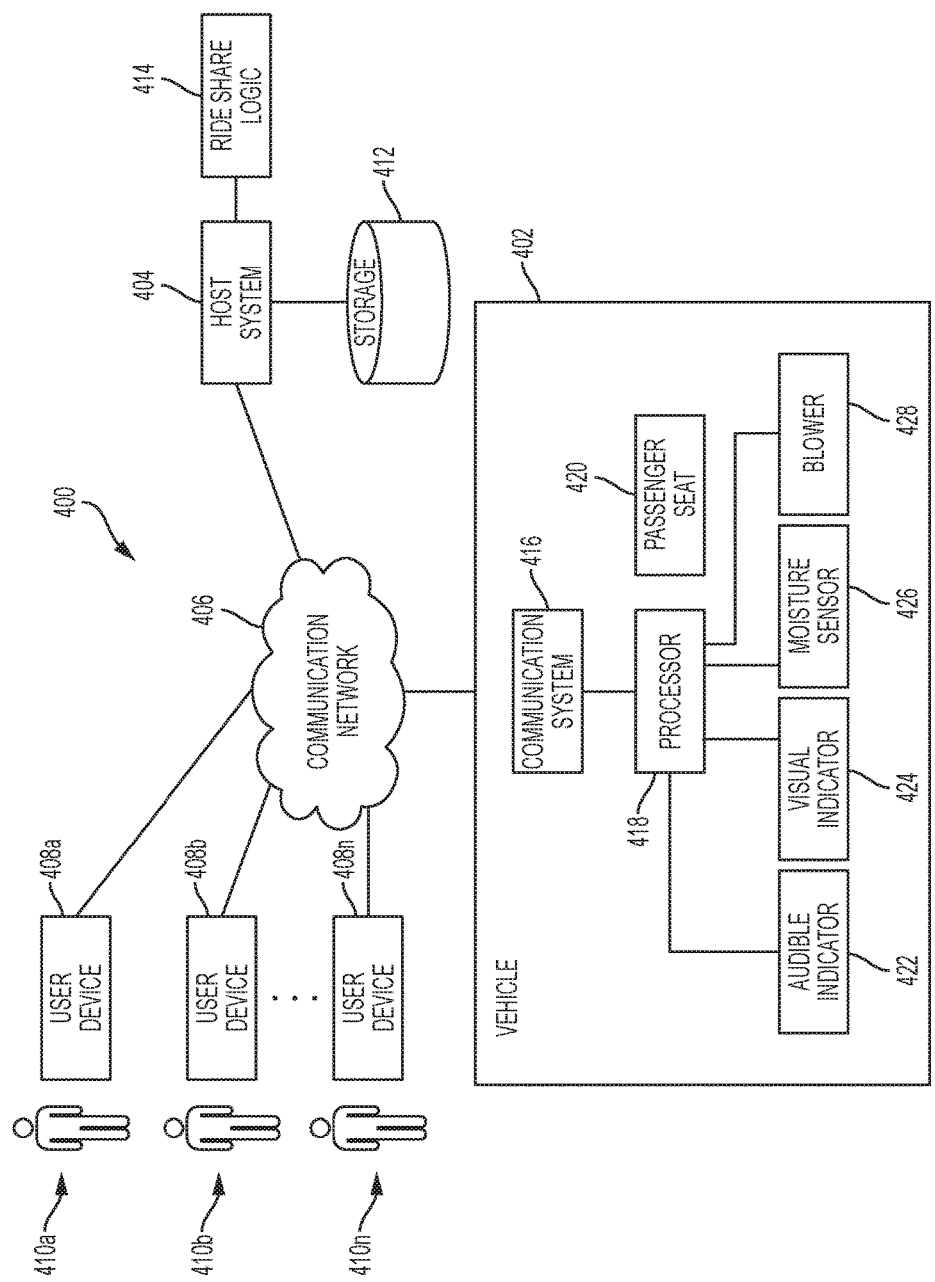
FIG. 4 is a schematic illustration of system on which vehicle trip and/or ride sharing services may be implemented in accordance with an exemplary embodiment of the present disclosure.

FIG. 4 is a schematic illustration of system 400 on which vehicle trip and/or ride sharing services may be implemented in accordance with an exemplary embodiment of the present disclosure. The system 400 includes a vehicle 402 in communication with a host system 404 across a communication network 406. The system 400 further includes user devices 408A-408n of prospective riders 410A-410n. Each of the vehicle 402, the host system 404, and user devices 408 are communicatively coupled to one another via one or more communication networks 406.

The host system 404 may be implemented as a high-speed computer processing device (e.g., a mainframe computer) capable of handling a high volume of activities conducted by the vehicle 402 and the user devices 408 with regard to the host system 404. The host system 404 may be operated by an enterprise or organization implementing the exemplary ride sharing services. The host system 404 may operate as a web server including a web site for generating accounts or subscriptions to the ride sharing services. The host system 404 may also operate as an application server including one or more applications for providing the ride sharing services. These one or more applications are collectively referred to herein as ride share logic 414. In an embodiment, the host system 404 is communicatively coupled to a storage device 412, which stores accounts established for subscribers of the ride share services, as well as related data used to facilitate the ride services. Account records created via the ride share logic 414 may include subscriber identification data (e.g., name, address, employer business name and address), billing account information, such as bank account data, and any other characteristics of the subscribers used in implementing the ride share services. While the storage device 412 is shown in FIG. 4 as a separate physical device from the host system 404, it will be understood that the storage device 412 may be integrated into the host system 404 as internal storage (e.g., as a hard disk drive).

The user devices 408A-408n may be any type of communications device capable of sending and receiving information over a network. For example, the communications devices 408A-408n may include one or more wireless communications devices (e.g., cellular telephone, smart phone, personal digital assistant) and wireline communications device (e.g., a general desktop computer or laptop) or may be a communication system as described further herein with respect to the vehicle 402. The prospective riders 410A-410n refer to subscribers of the ride share services who are seeking to participate in a ride share event. A ride share event refers to a carpooling activity in which a prospective rider 410A-410n has been accepted or approved for sharing a ride with another subscriber, or a subscriber who is currently sharing a ride with another subscriber. The prospective riders 410A-410n may be engaged in seeking a ride share event via a corresponding communications device or have been approved and are waiting at a pick up location for a ride share event. The communications devices 408A-408n may be configured to send and receive communications either directly with a subscriber who is offering a ride share event or through the host system 404, which conveys the ride share event information to the subscriber offering the ride share event. The communications between subscribers may be conveyed by any means desired, such as text, instant message, voice, etc.

The communication network 406 may be any type of network known in the art. For example, the network 406 may be a combination of public (e.g., Internet), private (e.g., local area network, wide area network, virtual private network), and may include wireless and wireline transmission systems (e.g., satellite, cellular network, terrestrial networks, etc.) without limitation.

The vehicle 402 includes a communication system 416, which in turn may include multiple components such as, for example, input/output (I/O) components (not shown), each of which may be in communication with one another via a communications bus (not shown). The vehicle also includes a processor 418 that executes logic in accordance with a method of the present disclosure.

While the exemplary ride share services are described herein with respect to a communication system 416, which is described as an onboard vehicle system, it will be understood that other implementations may be configured to realize the advantages of the present disclosure. For example, a portion of the functionality performed by the communication system 416 may be implemented using a wireless communications device, e.g., a smart phone and corresponding logic, that is communicatively coupled in a wireless fashion to components of the communication system 104 via a short-range communications network (e.g., via BlueTooth™) without limitation.

The vehicle 402 further includes one or more a vehicle passenger seats 420, an audible indicator 422, a visual indicator 424, a moisture sensor 426, a blower 428. These components may operate in a manner that is the same as or similar to that described with reference to FIGS. 1A through 3C while in communication with processor 418.

In operation, one or more prospective riders 410A-410n may operate their user devices 408A-408n to initiate a ride request via the communication network 406 to the host system 404. The host system 404 may then select a vehicle 402 from among a plurality of available vehicles in the ride share system and dispatch that vehicle 402 to the location of the prospective rider issuing the request and/or, if a rider is already occupying the vehicle 402, submit a request to the rider in the vehicle through their user device for an offer to share the ride with the prospective rider.

In contrast, with existing ride sharing systems, the moisture sensor 426 in communication with the processor 418 in the vehicle 402 enables a determination of whether a vehicle passenger seat 420 is available for occupancy by a prospective rider. If the processor 418, in communication with the moisture sensor 426 determines that the vehicle passenger seat 420 has a wet area, the processor 418 may communicate with the host system 404 and alert the host system 404 that the seat is not in a condition to be offered to a prospective rider. In other words, a vehicle passenger seat 420 having a wet area may be removed from service. Meanwhile, other vehicle passenger seats 420 in the vehicle that may not have a wet area may continue to be available and offered to prospective riders. Optionally, the vehicle 402 may be removed from service and submitted for maintenance to remedy the wet area and return the vehicle passenger seat 420 (and, in turn, the vehicle 402) back into service and made available to prospective riders.

Alternatively, the ability of the vehicle 402 to provide visual and/or audible may also alert a current passenger of the wet condition through the use of the audible indicator 422, visual indicator 424, and/or the user device 408. In this manner, the system may prompt a current rider, who may have caused the wet condition, to remedy the wet condition, thereby enabling the vehicle 402 to selectively remove the vehicle passenger seat 420 from availability for a prospective rider via the host system 404 and ride share logic 414 and to return the vehicle passenger seat 420 to availability for a prospective rider via the host system 404 and ride share logic 414 when/if the current rider remedies the wet condition.

Further, the vehicle 402 includes one or more blowers 428 which, as a result of their communication with the processor 418, may selectively operate to remedy a wet condition from the vehicle passenger seat 420 in the event that the processor 418 determines that the moisture sensor 426 generates a signal indicating that the moisture level of the vehicle passenger seat 420 exceeds a predetermined threshold. In this manner, one or more vehicle passenger seats 420 having a wet condition may be removed from service and made unavailable to prospective riders via the host system 404 and ride share logic 414 until the wet condition is remedied.

Figure 5:
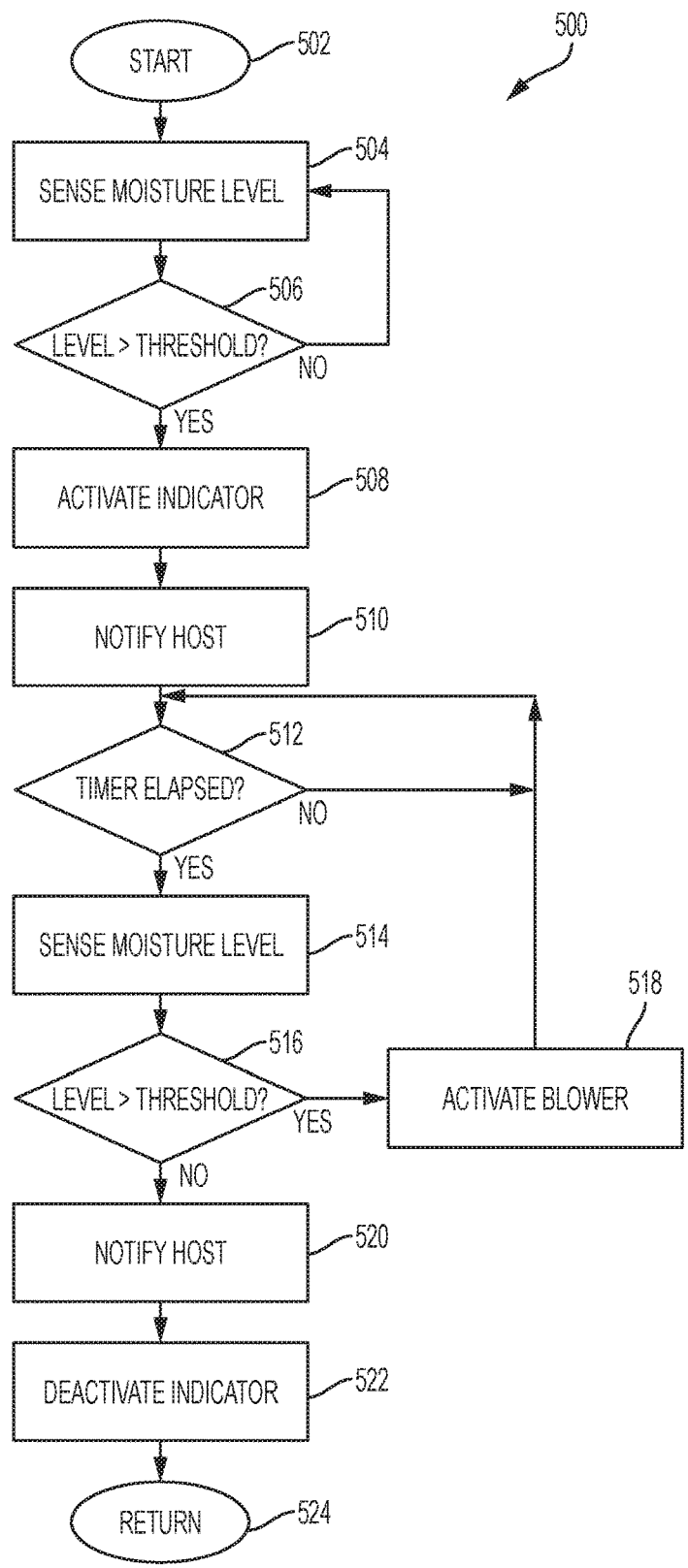
FIG. 5 is a flowchart of an exemplary method in accordance with the present disclosure.

FIG. 5 is a flowchart 500 of an exemplary method in accordance with the present disclosure. The method starts at step 502 and continues to step 504. In step 504, the moisture sensor senses the moisture level of the vehicle passenger seat and continues to step 506. In step 506, the processor receives a moisture level signal from the moisture level sensor and determines whether the moisture level signal exceeds a predetermined threshold moisture level. If, in step 506, the processor determines that the moisture level signal from the moisture level sensor does not exceed the predetermined threshold moisture level, then the method returns to step 504. If, however, in step 506, the processor determines that the moisture level signal exceeds a predetermined threshold moisture level then the method continues to step 508. In step 508, the method activates an indicator, such as, for example, a visual indicator and/or an audible indicator in the vehicle which provides an indication in the vehicle that the vehicle passenger seat has a wet condition. This provides an opportunity for a rider that may currently be occupying the vehicle to remedy the wet condition. The method then continues to step 510 where the host system is notified of the wet condition of the vehicle passenger seat. In response, the host system may at least temporarily remove that vehicle passenger seat from the pool of available seats in that vehicle and assign and/or re-assign vehicles to prospective riders accordingly. The method then continues to step 512 where the processor determines whether a timer which may have been initiated in response to the wet condition indication in step 506 has elapsed. The timer may be set to a predetermined amount of time which may provide enough time for an occupant of the vehicle to remedy the wet condition of the seat and/or a predetermined amount of time within which a blower may be activated to actively dry the vehicle seat. If, in step 512, the processor determines that the timer has not elapsed then the method returns to step 512. If, however, in step 512, the processor determines that the timer has elapsed then the method continues to step 514. In step 514, the moisture level sensor senses the moisture level of the vehicle passenger seat and the method continues to step 516. In step 516, the processor receives a moisture level signal from the moisture level sensor and determines whether the moisture level signal exceeds the predetermined threshold moisture level. If in step 516, the processor determines that the moisture level signal exceeds a predetermined threshold moisture level then the method continues to step 518. In step 518, a blower in the vehicle is activated to initiate a drying process for the wet condition of the vehicle passenger seat and the method then returns to step 512. If, however, in step 516, the processor determines that the moisture level signal from the moisture level sensor does not exceed the predetermined threshold moisture level, then the method continues to step 520 where the method continues to step 520. In step 520, the method notifies the host that the vehicle passenger seat is now dry and available for prospective riders. In response, the host may then assign and/or re-assign vehicles and vehicle passenger seats in those vehicles based upon the newly available dry vehicle passenger seat. The method then continues to step 522 where the method deactivates indicators in the vehicle which may have been indicating a wet condition for the vehicle passenger seat. The method then continues to step 524 where the method returns to the start at step 502.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle passenger seat for a vehicle, comprising:
 a moisture sensor that detects a moisture level of the vehicle passenger seat and generates a moisture level signal based upon the detected moisture level;
 a processor in communication with the moisture sensor and that determines whether the moisture level signal exceeds a predetermined moisture level threshold; and
 a blower, wherein the processor further activates the blower in response to a determination by the processor that the moisture level signal exceeds the predetermined moisture level threshold, and wherein the processor further estimates a drying time in response to blower activation and based upon the detected moisture level.

2. The seat of claim 1, further comprising an indicator that indicates when the moisture level signal exceeds the predetermined moisture level threshold.

3. The seat of claim 2, wherein the indicator comprises one of a visual indicator.

4. The seat of claim 2, wherein the indicator comprises an audible indicator.

5. The seat of claim 4, wherein the audible indicator comprises a vocal indicator that generates a vocal request to dry the vehicle passenger seat.

6. A vehicle comprising:
 a vehicle passenger seat positioned within the vehicle;
 a moisture sensor that detects a moisture level of the vehicle passenger seat and generates a moisture level signal based upon the detected moisture level;
 a processor in communication with the moisture sensor and that determines whether the moisture level signal exceeds a predetermined moisture level threshold; and
 a blower, wherein the processor further activates the blower in response to a determination by the processor that the moisture level signal exceeds the predetermined moisture level threshold, and wherein the processor further estimates a drying time in response to blower activation and based upon the detected moisture level.

7. The vehicle of claim 6, further comprising an indicator that indicates when the moisture level signal exceeds the predetermined moisture level threshold.

8. The vehicle of claim 6, wherein the indicator comprises a visual indicator.

9. The vehicle of claim 6, wherein the indicator comprises an audible indicator.

10. The vehicle of claim 9, wherein the audible indicator comprises a vocal indicator that generates a vocal request to dry the vehicle passenger seat.

11. The vehicle of claim 6, wherein the blower is embedded within the vehicle passenger seat.

12. The vehicle of claim 6, wherein the blower is positioned adjacent to the vehicle passenger seat in the vehicle.

13. A system for implementing ride share services, the system comprising:
 a vehicle comprising:
  a vehicle passenger seat positioned within the vehicle;
  a moisture sensor that detects a moisture level of the vehicle passenger seat and generates a moisture level signal based upon the detected moisture level; and
  a processor in communication with the moisture sensor and that determines whether the moisture level signal exceeds a predetermined moisture level threshold; and
 the system further comprising a host computer in communication with the processor and in selective communication with a plurality of user devices each corresponding with a prospective rider, the host computer implementing ride share logic that allocates vehicle passenger seats among a plurality of vehicle passenger seats in each of a plurality of vehicles based upon the determination by the processor whether the moisture level signal exceeds the predetermined moisture level threshold, wherein the ride share logic of the host computer further implements a wet seat indicator on one of the plurality of user devices.

14. The system of claim 13, wherein the one of the plurality of user devices currently occupies the vehicle.

15. The system of claim 13, wherein the one of the plurality of user devices belongs to a prospective rider.

* * * * *